United States Patent [19]
McKenna et al.

[11] Patent Number: 5,007,772
[45] Date of Patent: Apr. 16, 1991

[54] FRUIT HARVESTING MACHINE

[76] Inventors: Frank J. McKenna, 15914 Chadbourne, Shaker Heights, Ohio 44120; Richard K. Horst, 16201 Burton City Rd.; James F. Horst, 16155 Burton City Rd., both of Orrville, Ohio 44667; Rodney L. Arney, 15995 Hackett Rd., Dalton, Ohio 44618

[21] Appl. No.: 550,811

[22] Filed: Jul. 10, 1990

Related U.S. Application Data

[63] Continuation of Ser. No. 261,337, Oct. 24, 1988, abandoned.

[51] Int. Cl.$^5$ .............................................. B60P 1/60
[52] U.S. Cl. ........................... 406/39; 406/151; 414/508; 56/328.1
[58] Field of Search ............... 414/469, 486, 501, 508, 414/537, 538; 285/165, 406, 903; 105/279; 56/328.1; 406/39, 151

[56] References Cited

U.S. PATENT DOCUMENTS

| | | | |
|---|---|---|---|
| 2,450,152 | 9/1948 | Miller | 414/508 |
| 2,821,312 | 1/1958 | Wiegel | 414/508 |
| 2,973,112 | 2/1961 | Young | 414/508 |
| 3,165,341 | 1/1965 | Burns et al. | 285/406 |
| 3,329,290 | 7/1967 | Lowery | 414/508 |
| 3,493,132 | 2/1970 | Merrill | 414/508 |
| 3,523,404 | 8/1970 | Girardi | 414/508 X |
| 3,878,957 | 4/1975 | Rempel | 414/486 |
| 4,200,950 | 5/1980 | Coverley | 406/39 X |
| 4,625,998 | 12/1986 | Drandt et al. | 285/903 X |
| 4,650,224 | 3/1987 | Smith | 285/165 |

FOREIGN PATENT DOCUMENTS

| | | | |
|---|---|---|---|
| 3601256 | 7/1987 | Fed. Rep. of Germany | 406/39 |
| 0028025 | 3/1981 | Japan | 414/469 |
| 1467015 | 3/1989 | U.S.S.R. | 406/39 |

*Primary Examiner*—David A. Bucci
*Assistant Examiner*—John VandenBosche
*Attorney, Agent, or Firm*—Calfee, Halter & Griswold

[57] ABSTRACT

A machine for harvesting fruit including a supporting vehicle (30, 31) having a hopper 40 on one end (31) and a three-section extensible boom (80a, 80b, 80c) rotatably mounted on the other end (30) and having a bucket (96) on the outer end of the boom, and extensible conduits (82a, 82b, 82c) enclosed within the boom for conducting fruit to and through an extended conduit system (99, 75b) and into the boom.

10 Claims, 14 Drawing Sheets

FRUIT HARVESTING MACHINE

This is a continuation of copending application Ser. No. 07/261,337, filed on Oct. 24, 1988, now abandoned.

TECHNICAL FIELD

The invention relates generally to machines for aiding in harvesting fruit from trees and more particularly to a machine having a rotatable and extensible boom carried on a vehicle, with a bucket at the outer end of the boom for supporting a man, and means for conducting fruit picked by the man through the boom to a storage hopper mounted on the vehicle.

BACKGROUND ART

For many years, the harvesting of various kinds of fruit from commercial orchards has been done by hand picking from ladders by pickers carrying sacks for receiving the fruit. In recent years the scarcity of labor and greatly increased labor costs have spawned a variety of mechanical picking machines and systems, particularly in the citrus orchards supplying the large demand for juice concentrates.

One of the most recent machines designed to aid in the picking operation is the machine disclosed in U.S. Pat. No. 3,878,957 dated Apr. 22, 1975. A copy of the patent is enclosed. Many of these machines have been built and operated successfully in the state of Florida.

However, as is usual in the case of newly designed machines, certain improvements have been designed as the result of operations in the field by these latter machines, and the present invention embodies such improvements. For example, it was found desirable in order to facilitate maneuvering the bucket in and around the tree branches to change the extensible part of the boom from two arms or sections to three sections. This change caused certain problems in construction, resulting in the creation of improvements solving such problems.

Other problems arose in providing a durable and workable flexible conduit connection between the outer end of the boom as the bucket pivots on the boom to maintain the bucket level regardless of the changing inclination of the boom. Further improvements were created to solve those problems.

Another problem arose in connection with the fruit being crushed in the storage hopper, particularly as the hopper became increasingly loaded, adding more and more weight on the fruit in the lower part of the hopper. Further improvements were created to remedy that situation.

DISCLOSURE OF THE INVENTION

The general overall arrangement of the present harvesting machine is similar to that of U.S. Pat. No. 3,878,957, which is incorporated herein by reference. The principal differences embodied in the present machine include an extensible boom comprising three sections instead of two, with enclosed tubular fruit conduits telescopically slidable within the inner or lower boom section, the outer boom section being attached to the bucket. The inner boom section is pivotally mounted on an angularly disposed bottom arm which is rotatably mounted on the front end of the supporting vehicle having a tiltable hopper on its rear end, which receives fruit picked by a person in the bucket and conducted through the conduit system in the boom and thence extended to the hopper. Enclosed within the hopper is a novel baffle system which inhibits crushing of the fruit as it fills the hopper, which system will be described later herein.

An object of the present invention is to provide an improved fruit harvesting machine having three extensible boom sections which move relative to each other smoothly and easily without binding.

Another object is to provide an improved flexible conduit connection between the bucket and the outer end of the outer conduit section.

A further object is to provide a novel and improved baffle construction and arrangement in the storage hopper to prevent crushing of the fruit as the loading of the hopper increases.

Another object is to provide an improved quick detachable connection between the inner end of the inner conduit section and a flexible conduit elbow section.

A further object is to provide improved removable supports for fixedly mounting the outer conduit section on the outer boom section, and the inner end of the inner conduit section on the inner boom section.

A still further object is to provide improved means for slidably supporting the inner end of the middle conduit section on the outer boom section and the outer end of the inner conduit section on the middle boom section.

PREFERRED EMBODIMENT FOR CARRYING OUT THE INVENTION

Figure 1:
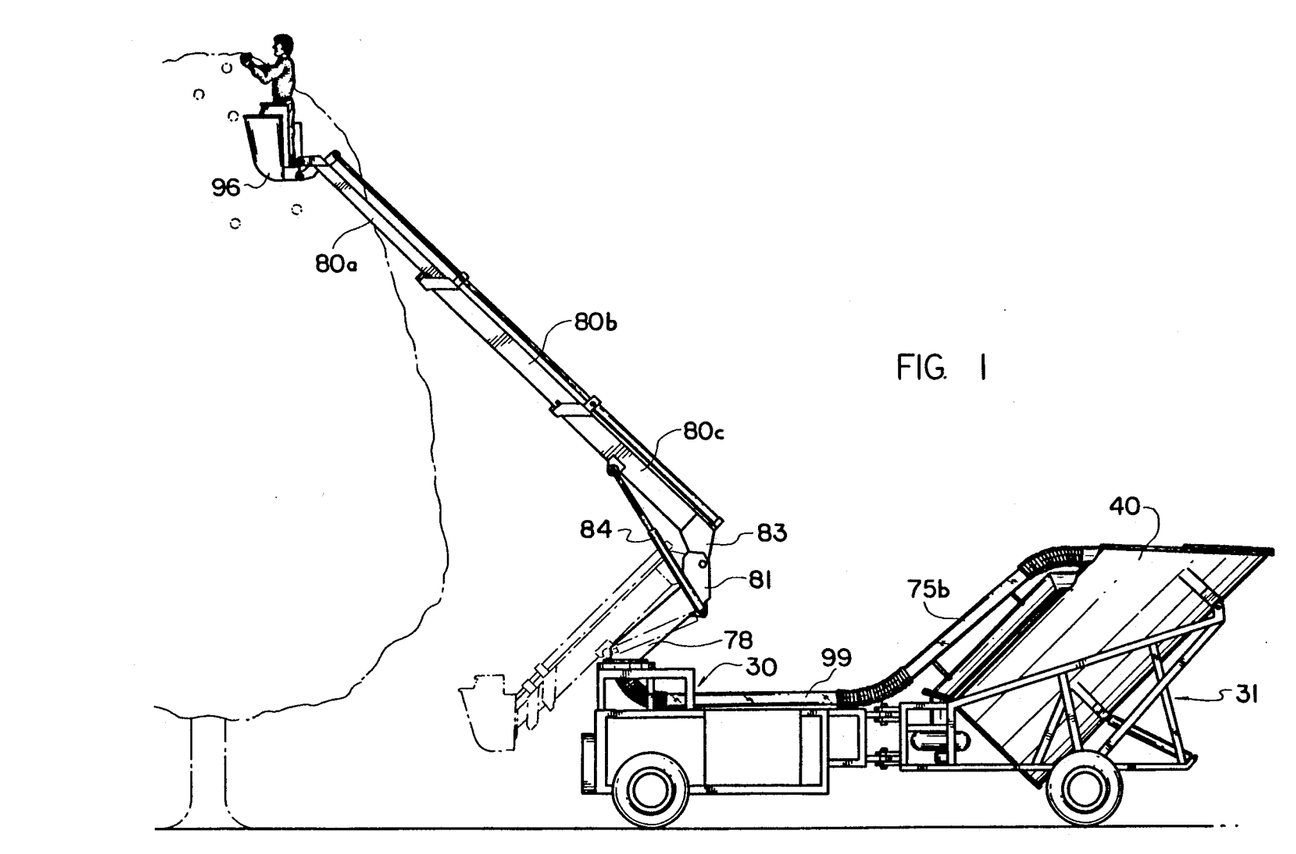
FIG. 1 is a side elevation of the improved fruit harvesting machine in operation with the boom extended, the boom and bucket being shown in phantom in retracted and lowered position.

As shown in FIG. 1, the improved harvesting machine comprises a support vehicle having a front section indicated generally at 30 and a rear section indicated at 31. An angularly disposed bottom boom arm 78' is rotatably mounted on the front vehicle section 30 and the hopper 40 is supported on the rear vehicle section. The extended conduit system conducting fruit from the bottom boom arm 78' to the upper end of the hopper 40 is indicated at 99, and 75b. A detailed description of the rotatable mounting of arm 78 on the vehicle, and of the steering mechanism between the front and rear vehicle sections, is described in detail in the above-referenced U.S. Pat. No. 3,878,957. In the present construction boom arm 78' is substantially shorter than arm 78 in the patent for reasons hereinafter described.

Figure 13:
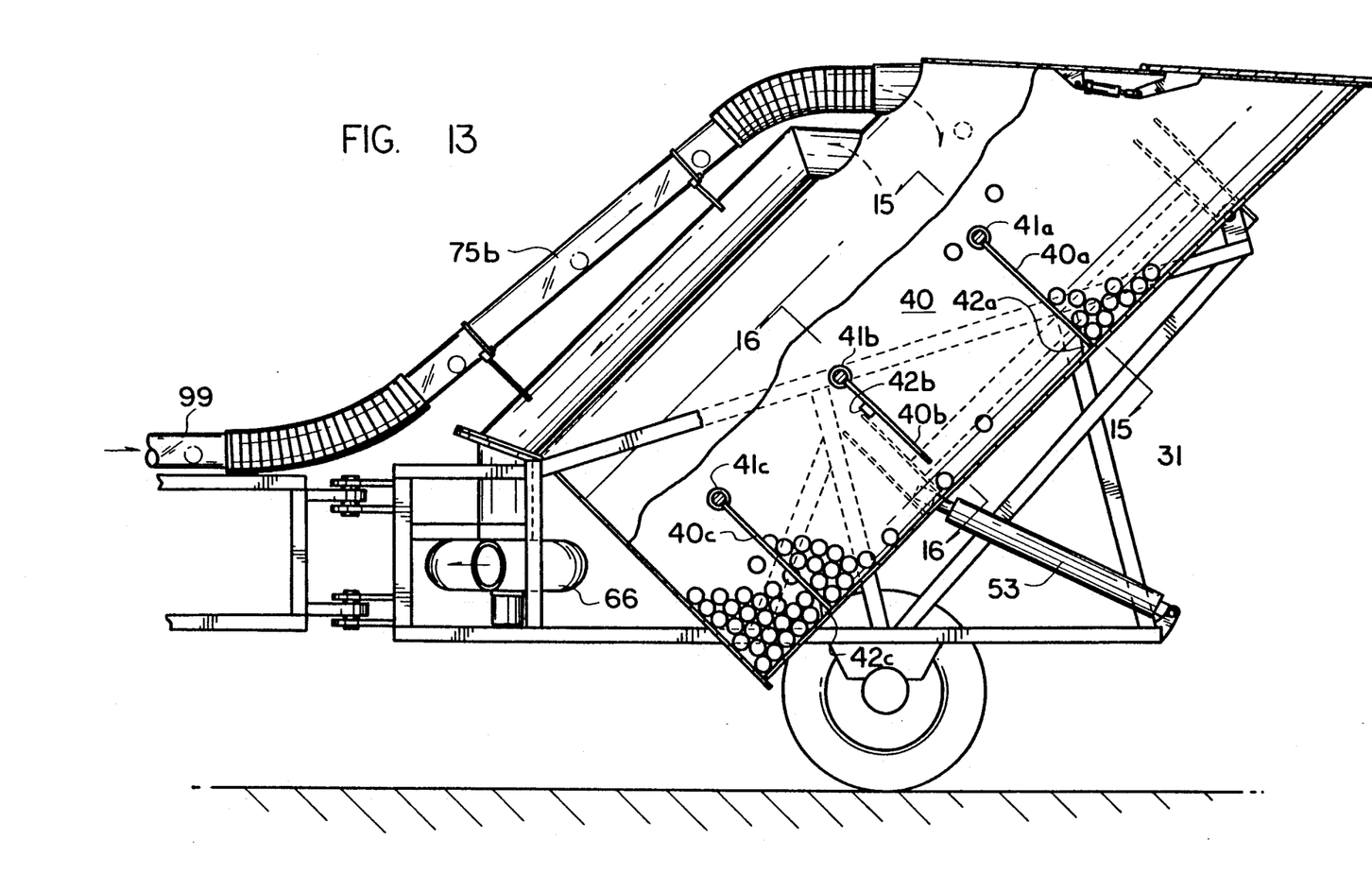
FIG. 13 is an enlarged side elevation, partly in section of the hopper showing the improved baffle system for cushioning the fruit being discharged into the hopper.
Figure 14:
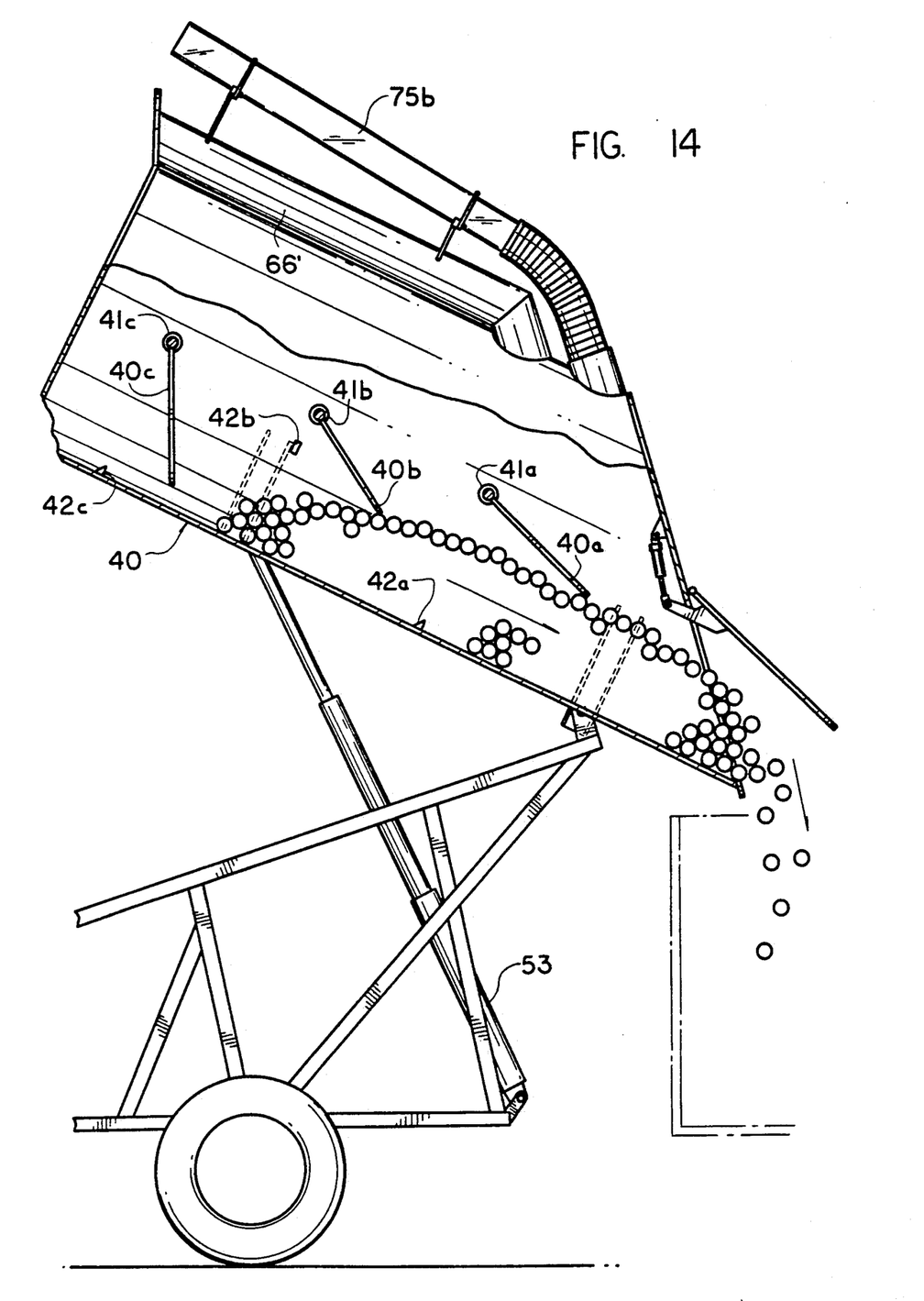
FIG. 14 is a similar view showing the hopper in dumping position.

Referring to FIGS. 13 and 14, the frame supporting the hopper 40 on the rear section 31 of the vehicle is described in detail in U.S. Pat. No. 3,878,957, as is the mechanism for tilting the hopper, including hydraulic cylinder 53. As indicated, fruit is conducted through conduit 75b into the upper end of the hopper by reason of the sub-atmospheric pressure maintained therein by exhaust blower 66 and conduit 66'.

In accordance with the present invention, a novel baffle system is provided in the hopper 40 to inhibit crushing of the fruit as it builds up therein. The system comprises three baffles 40a, 40b, and 40c pivoted medially of the hopper side walls at 41a, 41b and 41c, respectively, and extending toward the lower side of the hopper. Stops 42a, 42b and 42c are provided to position the baffles transversely of the hopper when it is in normal upright position as shown in FIG. 13.

Figure 15:
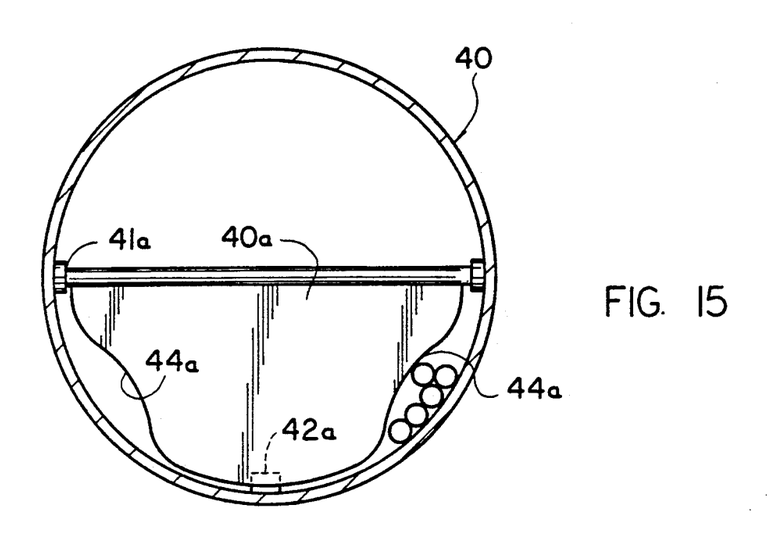
FIG. 15 is a partial cross section of the hopper taken on line 15—15 of FIG. 13.
Figure 16:
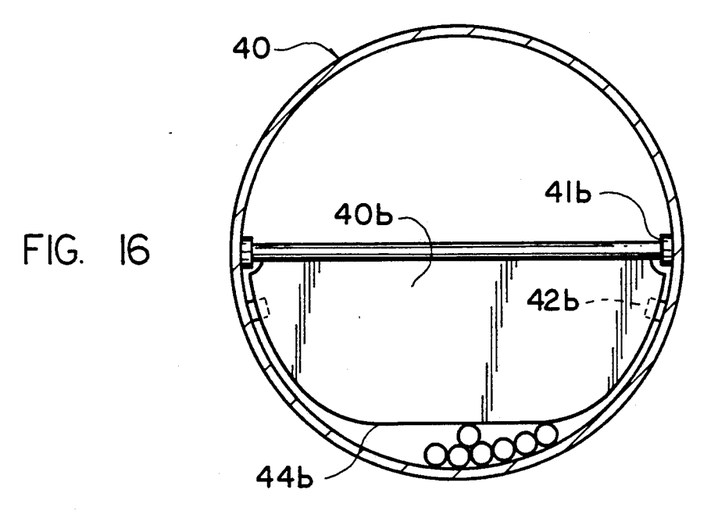
FIG. 16 is a partial cross section of the hopper taken on line 16—16 of FIG. 13.

As shown in FIGS. 15 and 16, baffle 40a has indented side edges 44a forming limited spaces through which fruit can gradually drop onto the baffle 40b, and baffle 40b has a flattened bottom edge 44b forming a space through which fruit gradually drops onto baffle 44c which has indented edges the same as edges 44a. Accordingly, the spaces formed by the indented side edges of the three baffles are misaligned or staggered so that the fruit cannot drop unrestrained past all three baffles.

As indicated in FIG. 13, as the fruit builds up in the hopper, the loading is partially supported in sections by the three baffles, which distributes the weight of the loading and inhibits crushing of the fruit. When the hopper is tilted to unload the fruit, the baffles are free to swing away from the stops, to allow unrestrained unloading, as depicted in FIG. 14.

Figure 2A:
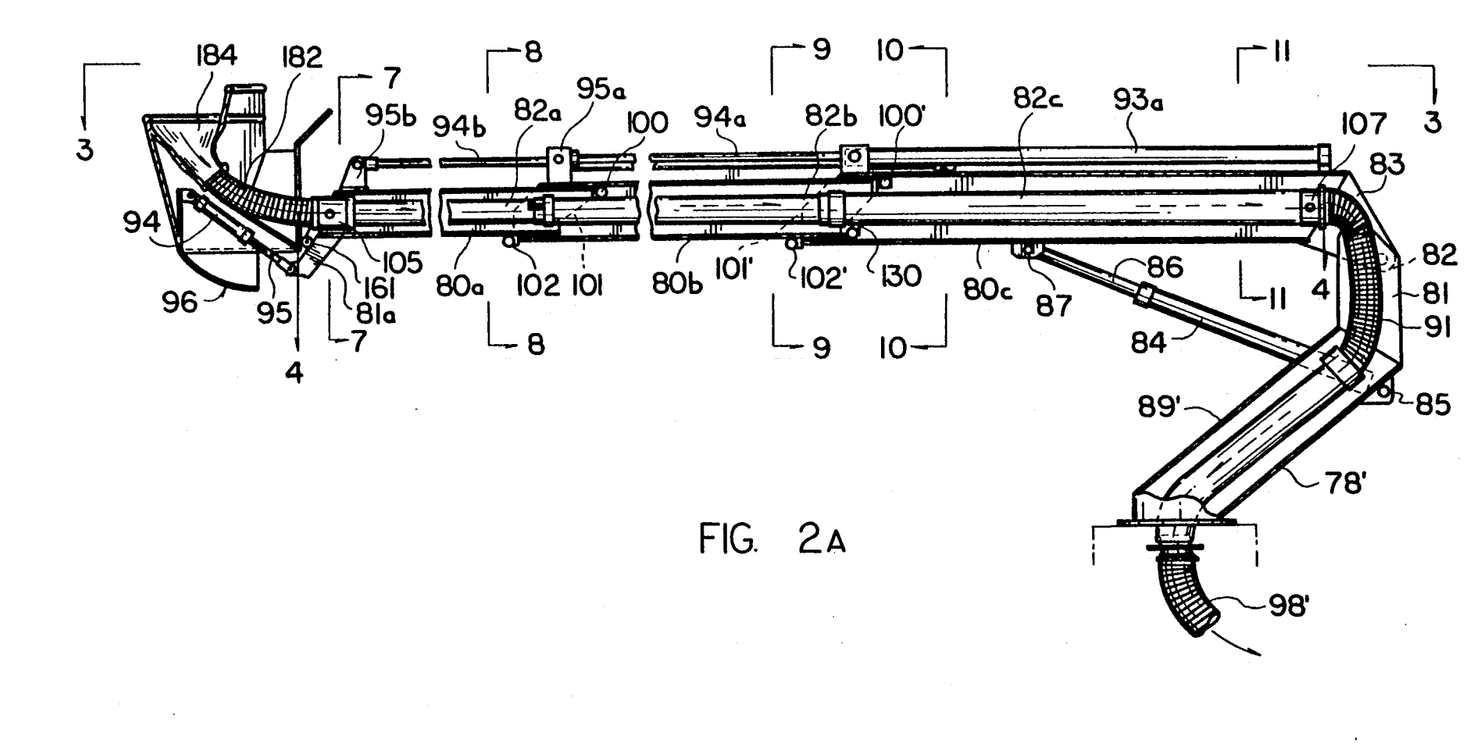
FIG. 2A is an enlarged cross section, partly broken away, of the boom and bucket, with the boom in an extended position.

Referring to FIGS. 1 and 2A, the extensible boom of the present invention comprises three sections 80a, 80b and 80c, the lower or innermost section 80c has sidewings 83 pivoted at 82 on flanged portions 81 extending upwardly from bottom boom arm 78'. The mechanism for raising and lowering the extensible boom preferably comprises a pair of hydraulic cylinders 84 on opposite sides of the boom, having their ends pivoted at 85 on the arm 78', and their piston rods 86 pivoted to brackets 87 on boom section 80c.

Figure 3:
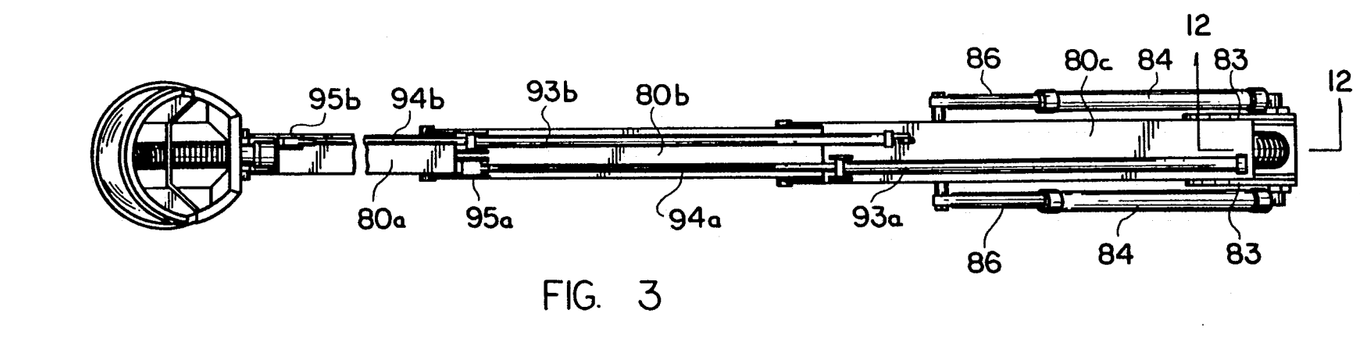
FIG. 3 is a plan elevational view thereof.

The boom sections 80a, 80b and 80c are rectangular in cross section, section 80b adapted to telescope within section 80c, and section 80a adapted to telescope within 80b. Extension and retraction of section 80b is accomplished by a hydraulic cylinder 93a (FIG. 3) mounted on top of section 80c and having its piston rod 94a connected to a bracket 95a on the outer end of section 80b. Extension and retraction of section 80a is accomplished by a hydraulic cylinder 93b mounted on top of section 80b and having its piston rod 94b connected to a bracket 95b on the outer end of section 80a.

Figure 2B:
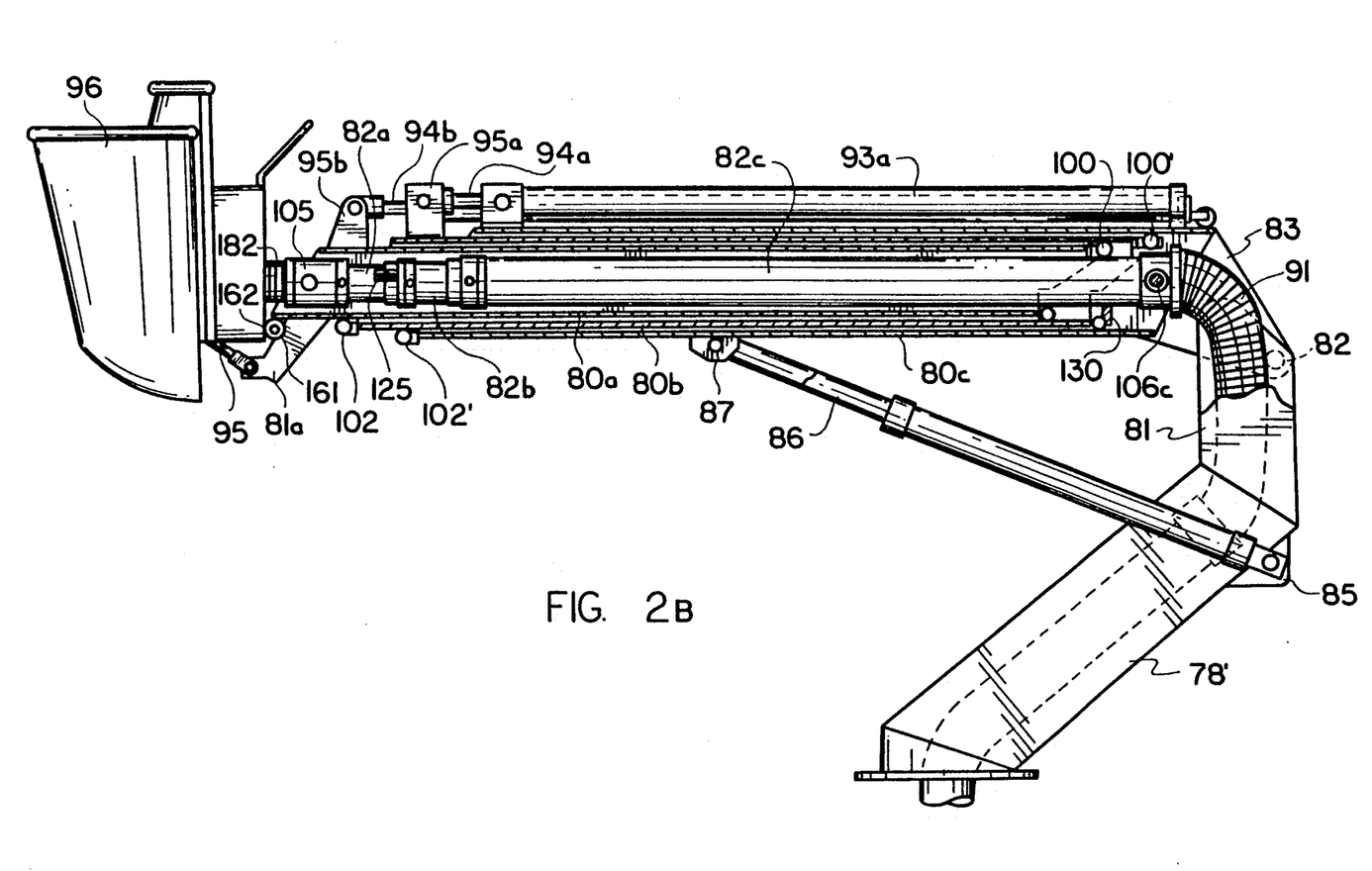
FIG. 2B is a similar view enlarged, showing the boom in retracted position.

Referring to FIGS. 1, 2A and 2B, the extensible boom 80a, 80b and 80c has an overall extended length substantially the same as the two-section boom in U.S. Pat. No. 3,878,957 in order to position the picker in the bucket to gather fruit from the top portions of relatively tall trees. However, fruit trees grow in closely spaced apart rows, and are often bushy in their lower portions, so that when the two section boom is fully retracted for picking fruit in those areas, the bucket extends too far into the branches to be manipulated for thorough picking. This situation is obvious from FIG. 1 of the patent.

By making the extensible boom in three sections the inner section 80c is much shorter than the inner section of the patent, without sacrificing overall length so that the bucket can be manipulated around and over rather than into the lower portions of the trees with the boom fully retracted, as seen in FIG. 1 herein. Also, the bottom boom arm 78' is preferably made shorter than the arm 78 of the patent to cooperate with the shorter inner boom arm 80c.

Referring to FIGS. 2A, 5, 6 and 8-10, the boom sections 80a, 80b and 80c are supported one on another by rollers mounted on the ends of the sections, thereby permitting telescopic sliding of one section within another. Section 80a has rollers 100 mounted on its inner upper end supporting the overlapping end of section 80b, and the overlapping end of section 80b has side plates 101 welded thereto mounting rollers 102 supporting the underlapping end of section 80a. The side plates may also carry side rollers 103 bearing on the sides of section 80a.

Similarly, section 80b has rollers 100' mounted on its inner upper end supporting the overlapping end of section 80c, and the overlapping end of section 80c has side plates 101' welded thereto mounting rollers 102' supporting the underlapping end of section 80b. The side plates may also carry side rollers 103' bearing on the sides of section 80b. As seen in FIGS. 5, 6, 9 and 10, additional side rollers 104 and 104' may be mounted on the ends of sections 80a and 80b respectively, bearing on the inner sides of overlapping sections 80b and 80c, respectively.

As shown in FIGS. 2A and 2B the front end of section 80a of the boom is supported by rollers 161 journaled on the pivot shaft 162 on which the bucket 96 is mounted. Side plates 81a on the front end of section 80a extend angularly downward therefrom and are connected with the piston rod 95 of a hydraulic leveling cylinder 94 for keeping the bucket substantially level regardless of the inclination of the boom.

Within the boom sections 80a, 80b and 80c are plastic cylindrical conduit sections 82a, 82b and 82c, respectively, mounted for telescopic sliding one within another along with the boom sections. It is essential that the conduits be arranged so that the outer conduit 82a is the smallest in diameter, conduit 82b is the next larger, and conduit 82c is the largest. This ensures free flow of the fruit from each conduit into a larger conduit without obstruction causing possible clogging and damage to the rind. The front or outer end of conduit section 82a is connected by a coupling 105 to a flexible tubular corrugated section 182 connected at its other end to a trough 184 in bucket 96 which receives the fruit picked by a man standing in the bucket. As described in detail in the aforesaid patent the controls for extending the boom and manipulating the bucket are mounted within the bucket.

Figure 4:
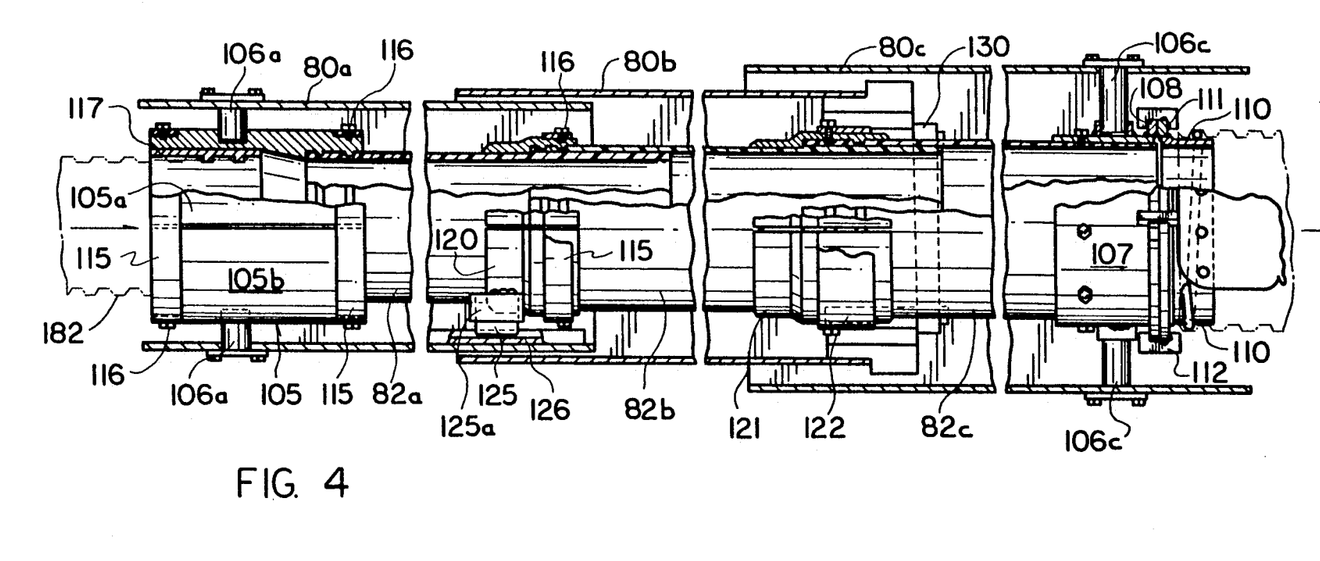
FIG. 4 is an enlarged plan sectional view taken on line 4—4 of FIG. 2, partly broken away, with parts deleted for the sake of clarity.
Figure 5:
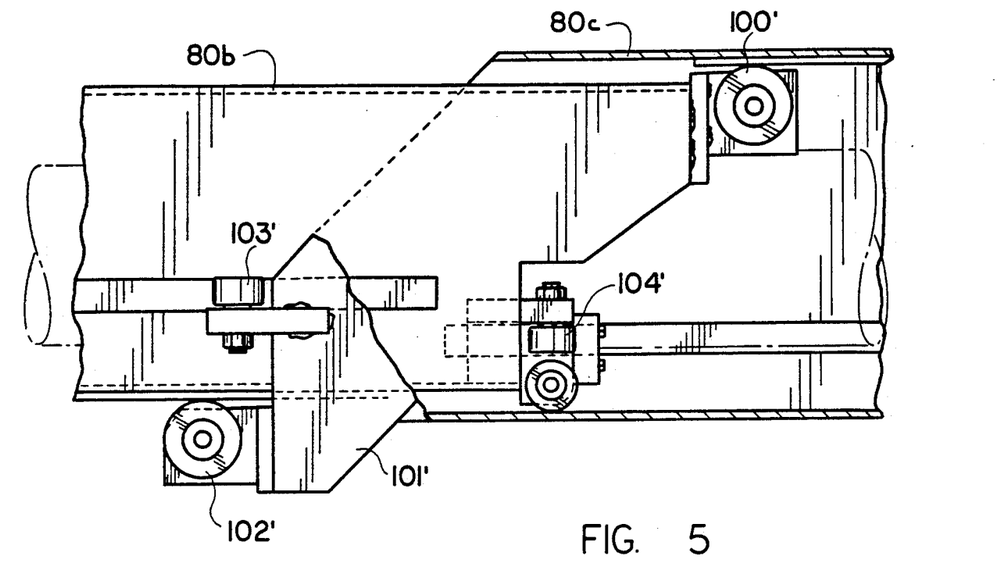
FIG. 5 is an enlarged partial side elevation, partly in section, showing the inner end of the middle boom section telescoped within the outer end of the inner boom section.
Figure 6:
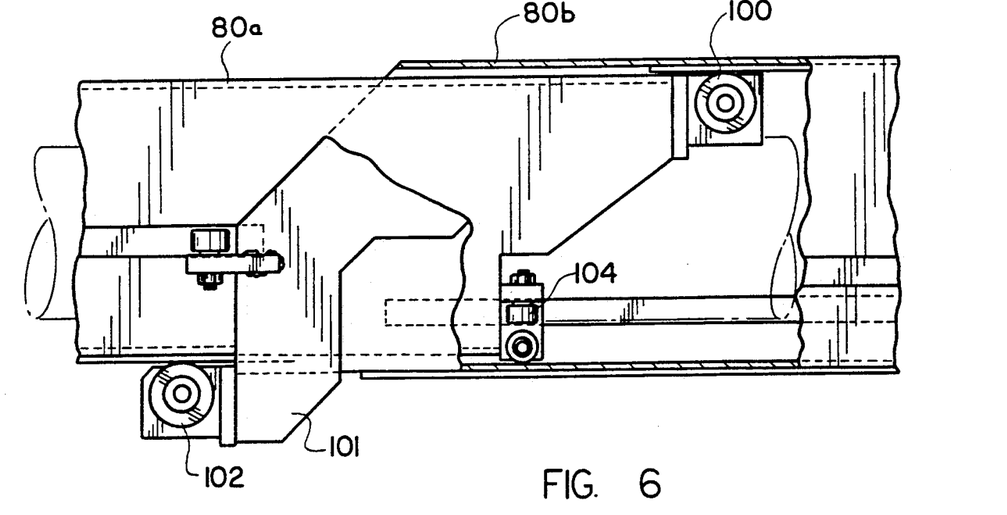
FIG. 6 is a similar view showing the inner end of the outer boom section telescoped within the outer end of the middle boom section.
Figure 7:
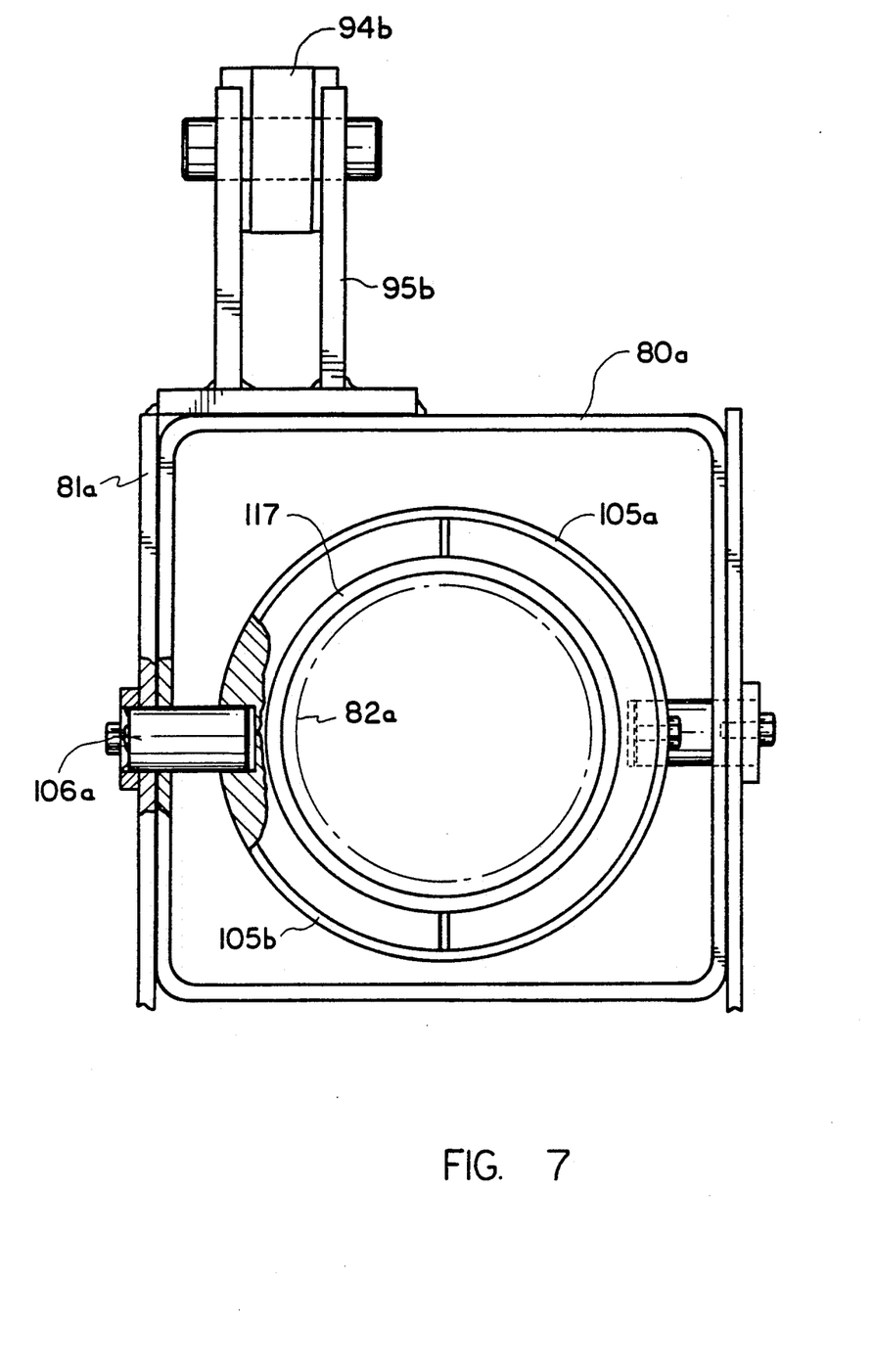
FIG. 7 is an enlarged cross sectional view taken on line 7—7 of FIG. 2.
Figure 11:
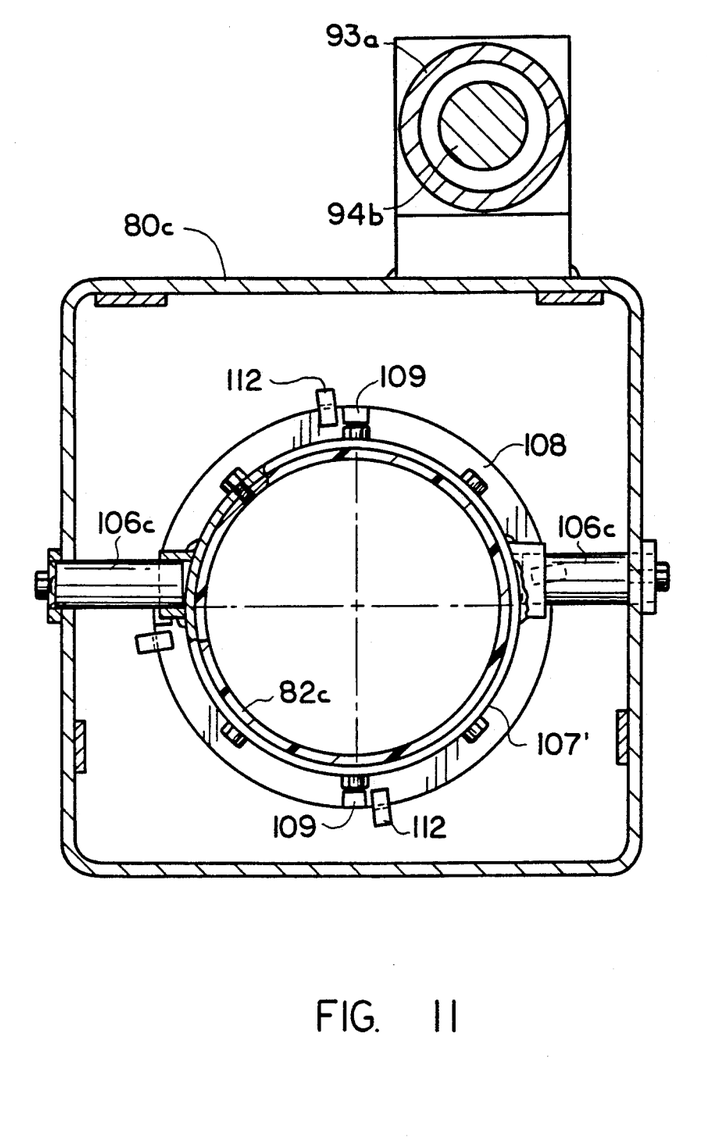
FIG. 11 is an enlarged cross sectional view taken on line 11—11 of FIG. 2.

As shown in FIG. 4, the coupling 105 is secured in the outer end of boom section 80a by diametrically opposite studs 106a bolted to the section 80a and received in sockets in coupling 105. Similarly, the inner end of conduit section 82c is secured in the inner end of boom section 80c by diametrically opposite studs 106c bolted to the section 80c and received in sockets in a flanged coupling member 107 bolted to conduit section 82c. As seen in FIG. 11, the flange 108 on coupling member 107 is slotted at 109. A mating coupling member 110 (FIG. 12) has a flange 111 abutting flange 108 with U-shaped clips 112 slidably engaging over flange 108 and are retractable through the slots 109, forming a bayonet lock between coupling members 107 and 110, which allows quick uncoupling for the purpose of inspecting the condition of the fruit within conduit 82c at that location.

Figure 12:
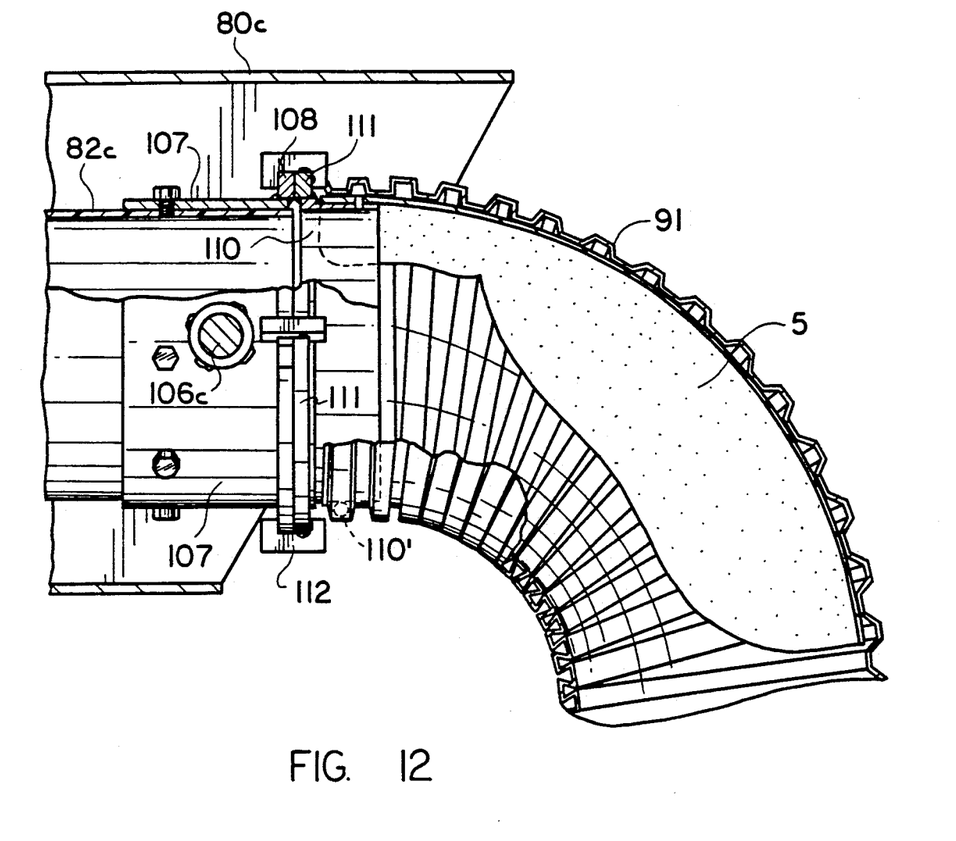
FIG. 12 is an enlarged partial sectional view showing the connection between the end of the tube or conduit within the lower boom section and the flexible elbow connection with the tube in the rotatable boom section.

Referring to FIGS. 4 and 12, a plastic shoe indicated at S lies within the flexible tube 91 opposite the inner end of conduit 82c and has its outer end bolted to coupling member 110. The shoe serves to cushion the shock of fruit traveling through the conduit.

As shown in FIG. 4, coupling member 110 has an exterior thread 110' thereon, which is screw connected to helical corrugations in an elbow-shaped flexible tubular conduit 91, which allows pivoting of the extensible boom toward and away from the bottom boom arm 78'.

Referring to FIG. 4, coupling 105 is split longitudinally to form two halves 105a and 105b which are clamped together by circular bands 115 secured thereto by screws 116. Within the outer portion of the coupling is a plastic liner 117 having interior helical threads engaged by the helical corrugations on the exterior of flexible conduit 182. The inner end of liner 117 abuts the base of an inwardly inclined surface in coupling 105. The inner portion of the coupling 105 has circumferential ribs engaged by matching grooves 119 on the outer end of conduit 82a to fix it in place.

The inner end of conduit 82a is secured within the outer end of conduit 82b by a split coupling 120 with its two halves clamped together by a circular band 115 secured thereto by screws 116. The interior of coupling 120 has an inner ribbed portion engaged with an exterior grooved portion on the outer overlapping end of conduit 82b, and inter-engaging shoulders are formed on the coupling and the inner end portion of conduit 82a to positively limit relative outer extension movement between conduits 82a and 82b. A similar arrangement is provided to secure the inner end of conduit 82b within the outer end of conduit 82c, comprising a split coupling 121 having its two halves clamped together by a circular band 122, and having interengaging shoulders formed on the coupling and the inner end portion of conduit 82b to limit relative outer extension movement between conduits 82b and 82c.

It is essential that the telescoping conduits 82a, 82b and 82c be adequately supported during their extension and retraction within the boom, as any misalignment causes binding and wear between the conduits as well as impeding the efficient travel of the fruit therethrough. These conduits are thin plastic material which is necessary to minimize weight, and accordingly have little bending strength. As seen in FIG. 4, when the boom is extended, conduit 82a is supported at its outer end on outer boom section 80a by studs 106a, but the inner end of conduit 82a and the outer end of conduit 82b cannot be similarly supported due to the relative sliding movement of conduit 82b.

Figure 8:
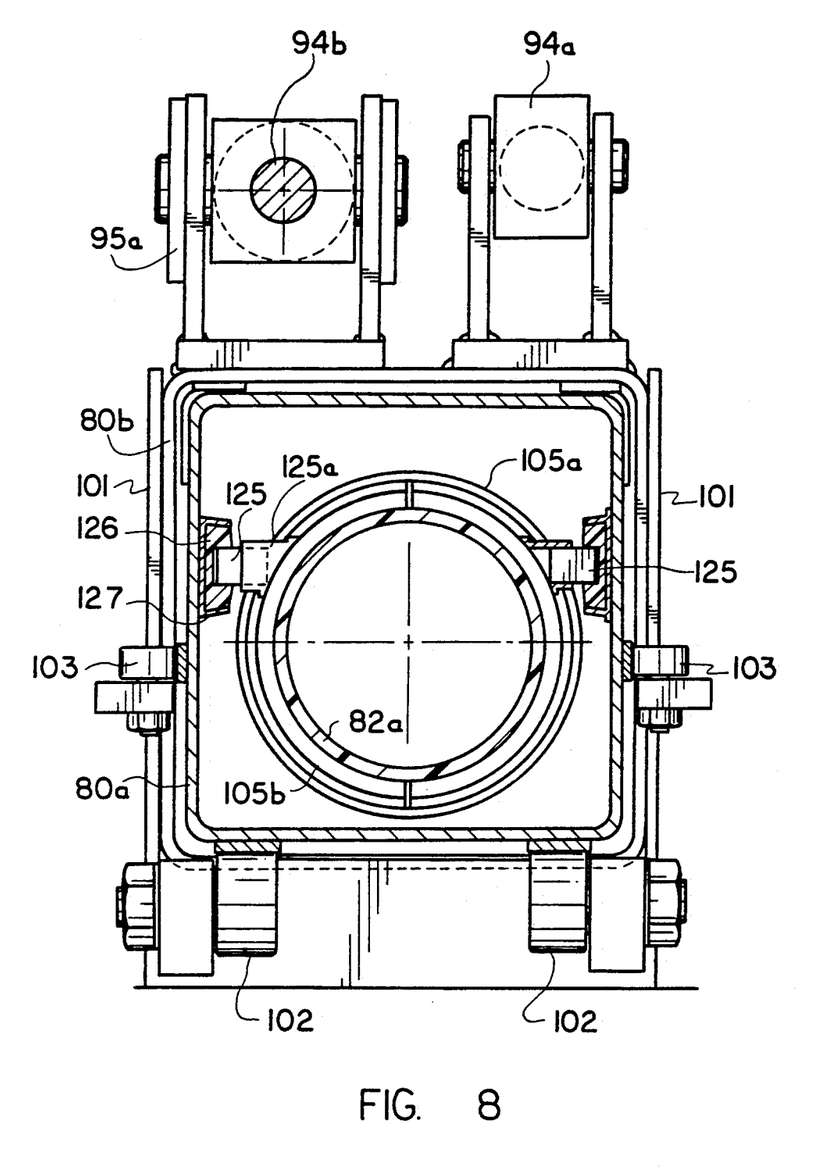
FIG. 8 is an enlarged cross sectional view taken on line 8—8 of FIG. 2.
Figure 9:
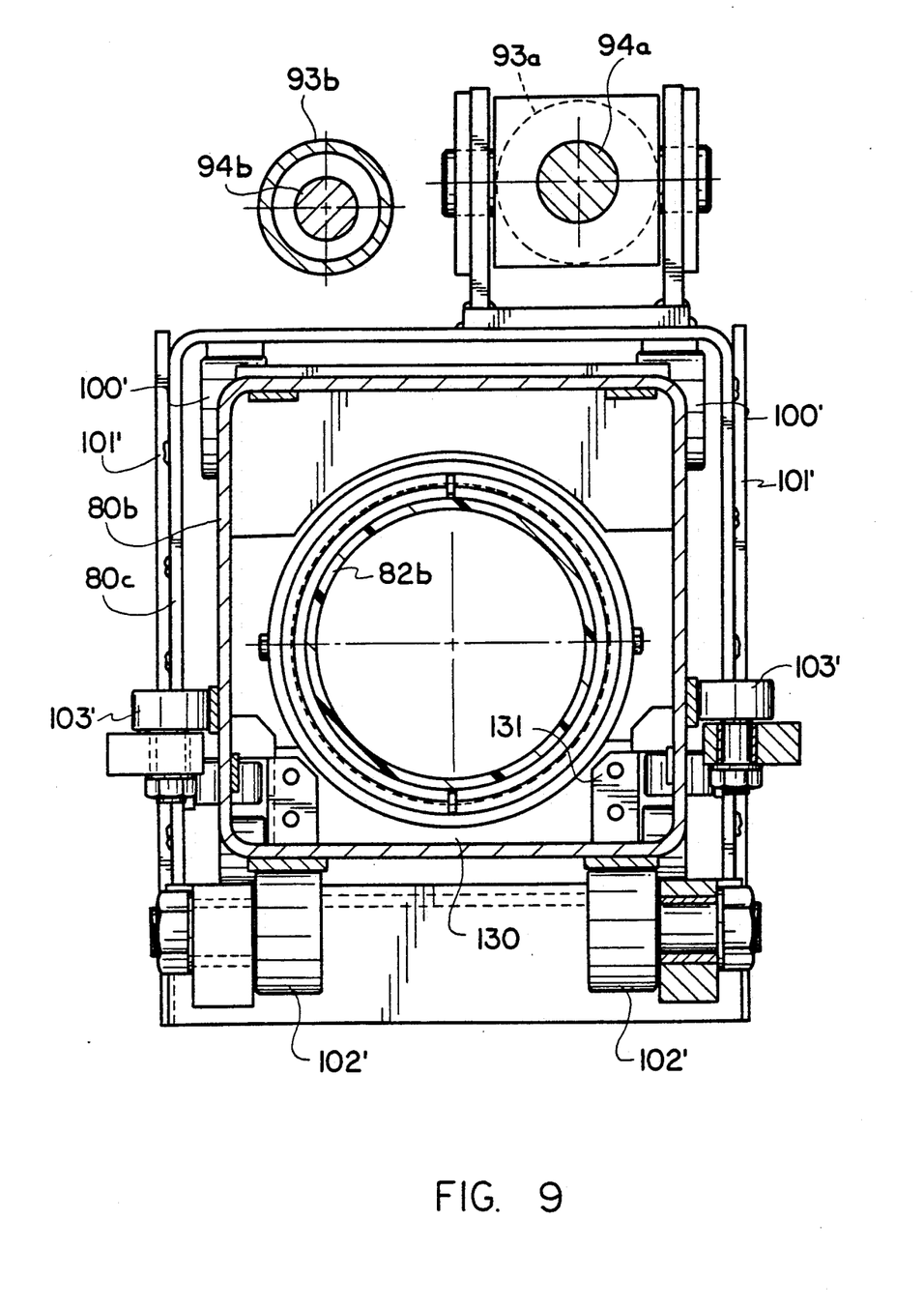
FIG. 9 is an enlarged cross sectional view taken on line 9—9 of FIG. 2.

As best shown in FIGS. 4 and 8, opposed supporting plugs 125 are mounted in sockets 125A on coupling 120 and slidably engage grooves in longitudinal plastic strips 126 gripped in channels 127 secured to opposite sides of boom section 80a. Thus, the overlapping ends of conduits 82a and 82b are supported on boom section 80a at all times during extension and retraction.

Figure 10:
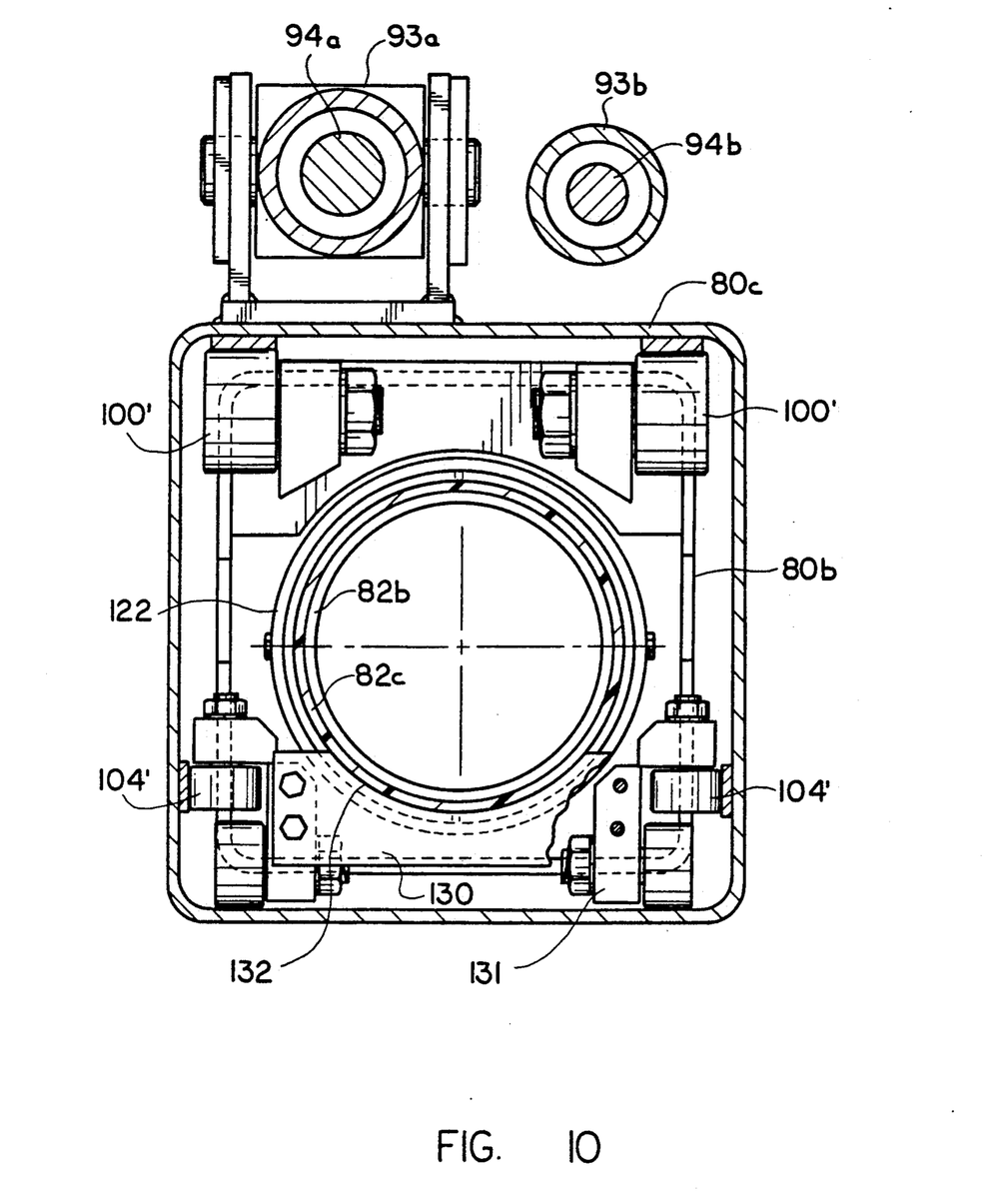
FIG. 10 is an enlarged cross sectional view taken on line 10—10 of FIG. 2.

Similarly, the outer end of conduit 82c cannot be supported on boom section 80c because of the telescoping movement of conduit 82b within conduit 82c. As best shown in FIGS. 4 and 10, a transverse supporting bar 130 is mounted on the inner end of boom section 80b for slidably supporting the outer end of conduit 82c as the conduit sections and boom sections extend and retract. This bar may be conveniently bolted on brackets 131 welded to the inner end of boom section 80b, as seen in FIG. 10, and it has an arcuate upper edge 132 for conforming to the cylindrical conduit 82c.

It is apparent that the improved harvesting machine provides an efficient extensible boom having three sections enclosing three conduit sections which are supported in alignment at all times to prevent binding of the sections and consequent clogging of the fruit, as well as an improved baffle system in the hopper to prevent crushing of the fruit conducted from the conduit system into the hopper.

We claim:

1. In a machine for harvesting fruit from trees including a supporting vehicle, a hopper mounted on the vehicle, an extensible boom having a bottom arm rotatably mounted on the vehicle, a man-supporting bucket on the outer end of the boom, a conduit system extending through said boom and from said boom to the hopper, and means for maintaining sub-atmospheric pressure in said hopper to conduct fruit from the bucket through the conduit system into said hopper, the improvement comprising the boom having inner, middle and outer telescopically slidable boom sections enclosing inner, middle and outer telescopically slidable fruit conduit sections, the boom sections and conduit sections respectively increasing in size from outside to inside, the outer end of the outer conduit section being fixedly mounted to the outer end of the outer boom section, the inner end of the inner conduit section being fixedly mounted to the inner end of the inner boom section, the outer end of the inner conduit section being supported by slidable support means mounted on the inner end of the middle boom section and the outer end of the middle conduit section being slidably supported on the outer boom section by the outer end of the middle conduit being provided with outwardly extending plug means slidably received in longitudinal groove means on the outer boom section.

2. In a machine for harvesting fruit from trees as in claim 1, wherein coupling means detachably connects the inner end of said inner conduit to the conduit system extending to the hopper, and said coupling means is fixedly mounted to said inner boom section.

3. In a machine for harvesting fruit from trees as in claim 1, a baffle system in said hopper for distributing the increasing weight of fruit being loaded into the hopper, comprising a series of spaced apart baffles pivoted in the hopper for progressively supporting portions of the incoming fruit.

4. In a machine for harvesting fruit from trees as in claim 3, wherein stops are provided on the hopper walls for supporting the baffles when the hopper is in its upright position.

5. In a machine for harvesting fruit from trees as in claim 4, wherein the peripheral edges of the baffles are indented to allow gradual passage of the incoming fruit.

6. In a machine for harvesting fruit from trees as in claim 5, wherein the indentations are staggered with respect to each other.

7. In a machine for harvesting fruit from trees as in claim 1, wherein the slidable support means comprises a transverse bar having an arcuate edge conforming to and in sliding contact with the inner conduit section.

8. In a machine for harvesting fruit from trees as in claim 1, wherein the outer conduit and middle conduit sections have a first coupling therebetween which permits relative sliding movement between the outer and middle conduit sections but limits outer extension of the outer conduit section relative to the middle conduit section, the middle conduit and inner conduit sections have a second coupling therebetween which permits relative sliding movement between the middle and inner conduit sections but limits outer extension of the middle conduit section relative to the inner conduit section.

9. In a machine for harvesting fruit from trees as in claim 8, wherein the first coupling is secured to the middle conduit section adjacent its outer end and has a radially inwardly extending shoulder at its outer end adapted to engage a radially outwardly extending flange on the inner end of the outer conduit section to limit the outer extension of the outer conduit section.

10. In a machine for harvesting fruit from trees as in claim 8, wherein the second coupling is secured to the inner conduit section adjacent its outer end and has a radially inwardly extending shoulder at its outer end adapted to engage a radially outwardly extending flange on the inner end of the middle conduit section to limit the outer extension of the middle conduit section.

* * * * *